May 15, 1928.
A. W. NORDGREN ET AL
1,670,163
BUMPER SUPPORT
Filed Jan. 16, 1928
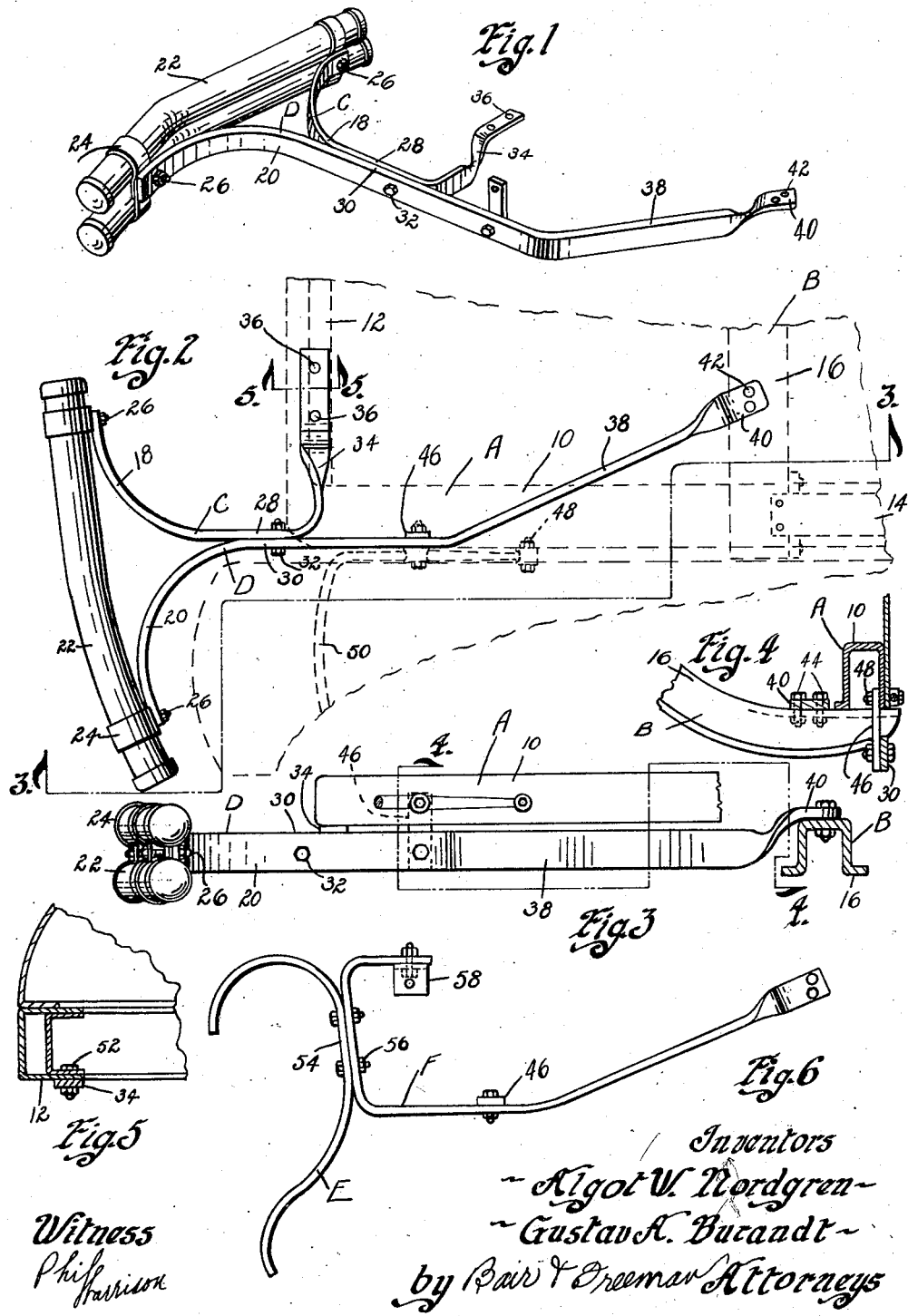

Patented May 15, 1928.

1,670,163

UNITED STATES PATENT OFFICE.

ALGOT W. NORDGREN AND GUSTAV A. BURANDT, OF ST. PAUL, MINNESOTA, ASSIGNORS TO MARQUETTE MANUFACTURING COMPANY, OF ST. PAUL, MINNESOTA.

BUMPER SUPPORT.

Application filed January 16, 1928. Serial No. 247,165.

The object of our invention is to provide a bumper support particularly adapted for the 1928 model Ford automobile, the parts being simple, durable and comparatively inexpensive in construction.

More particularly our invention relates to a pair of supporting arms each having outturned ends adapted to be connected to bumper elements and having portions resting against each other and connected together and then having their ends bent outwardly and away from each other for connection with the automobile frame at spaced points thereon, one of said supporting members having an upstanding lug adapted to be fastened to the fender brace connection normally provided for supporting the fender of the automobile.

With these and other objects in view our invention consists in the construction, arrangement and combination of the various parts of our device, whereby the objects contemplated are attained, as hereinafter more fully set forth, pointed out in our claims, and illustrated in the accompanying drawings, in which:—

Figure 1 is a perspective view of our improved bumper support and bumper elements connected thereto.

Figure 2 is a top plan view illustrating the connection of the bumper support with the automobile frame, the automobile parts being shown in dotted lines.

Figure 3 is a sectional view taken on the line 3—3 of Figure 2.

Figure 4 is a detail sectional view taken on the line 4—4 of Figure 3.

Figure 5 is a sectional view taken on the line 5—5 of Figure 2; and

Figure 6 is a slightly modified form of bumper support.

In the accompanying drawing we have used the reference character A to indicate generally an automobile body frame and B to indicate generally the chassis of the automobile. The frame A includes a longitudinal frame member 10 and a rear cross frame member 12.

The chassis B includes a longitudinal frame member 14 and a cross frame member 16. Our bumper support includes a pair of strap irons C and D, each having its outer ends curved outwardly and away from each other so as to provide curved end portions 18 and 20.

A pair of tubular bumper elements 22 are connected together by clamps 24 and in turn are connected to the extreme ends of the curved portions 18 and 20 of the elements C and D by means of bolts or the like 26. The two elements C and D are each provided with flat abutting portions 28 and 30 respectively.

The two flat portions 28 and 30 are connected together by means of a bolt 32. The flat portion 28 is bent substantially at right angles between its ends and forms a lateral extension 34. The extension 34 is in turn bent a quarter turn so that the normal vertical portion assumes a horizontal position where it may rest against the underside of the rear cross frame 12.

The extension 34 is provided with a pair of openings 36 whereby bolts or the like may be extended therethrough and through the frame 12 for connection with the automobile body frame A. The flat portion 30 of the element D projects rearwardly along the frame substantially beyond the bend in the portion 28 and is then inclined inwardly as at 38.

The extreme rear end of the portion 38 is bent a quarter turn so as to provide a horizontal portion 40 provided with a pair of openings 42. The openings 42 are adapted to receive bolts 44 whereby the ends of the element D may be connected with the rear cross frame 16 of the chassis B.

An upstanding lug 46 is connected to the portion 30 and projects up into the channel shaped body frame side member 10 and is connected to the bolt 48. The bolt 48 is normally provided for connecting the fender brace element 50 to the automobile body.

The connection between the lateral extension 34 and the rear cross frame member 12 is clearly shown in Figures 2 and 5 of the drawings and the reference numeral 52 indicates the bolts for connecting the extension 34 to the rear frame member 12.

In Figure 6 of the drawings, we have shown a slightly modified form of bumper support wherein a single element E is so formed as to have both of its ends connected to the bumper elements 22. The other element F forming a portion of the support is bent so as to provide two ends which connect with the rear cross frame 12 of the body frame A and with the rear cross frame 16 of the chassis B.

The elements E and F are each provided with flat portions 54 which are bolted together by means of bolts or the like 56. An angle clip 58 is bolted or riveted to one end of the element F and serves as a means for connection of such element with the rear frame 12.

An upstanding lug 46 is also fastened to the element F and connects the same with the fender brace connection normally provided upon the automobile.

Some changes may be made in the construction and arrangement of the parts of our device without departing from the real spirit and purpose of our invention and it is our intention to cover by our claims, any modified forms of structure or use of mechanical equivalents, which may be reasonably included within their scope.

We claim as our invention:

1. A bumper for automobiles comprising bumper elements, spaced fastening means connected to said bumper elements and bumper supports for connecting said bumper elements to the frame of an automobile, said supports including a pair of strap members each pair having parts connected to said fastening means and projected towards each other and having parts abutting each other and connected together, one of said strap members being of greater length than the other and having its inner end inclined inwardly and connected to the automobile frame, the other of said members having a portion bent at substantially right angles to the other strap member and having connection with the automobile frame and an upstanding lug secured to the longer of said members and having connection with the automobile frame.

2. A bumper for automobiles comprising bumper elements, spaced fastening means connected to said bumper elements and bumper supports for connecting said bumper elements to the frame of an automobile, said supports including a pair of strap members each pair having parts connected to said fastening means and projected towards each other and having parts abutting each other and connected together, one of said strap members being of greater length than the other and having its inner end inclined inwardly and connected to the automobile frame, the other of said members having a portion bent at substantially right angles to the other strap member and having connection with the automobile frame.

3. A bumper for automobiles comprising bumper elements, supporting means secured thereto for supporting the bumper elements relative to an automobile, said means including a bracket adapted to be fastened to the rear body member of the automobile, a side portion of said means extending adjacent the side body member of the automobile, an upstanding lug on said side portion connected to said side body member and a forwardly and inwardly directed portion extending from said side portion fastened to the rear cross member of the automobile chassis.

4. A bumper of the class described comprising bumper supporting members connected together intermediate their length, one end of one of said members being bent at right angles and one end of the other one being longer and bent forwardly and inwardly, said ends being twisted to lie against parts of an automobile frame and secured thereto, an upstanding lug on said longer end adapted to be secured to the automobile frame, the other ends of said members diverging and bumper elements secured to said diverging ends.

Des Moines, Iowa, January 5, 1928.

ALGOT W. NORDGREN.
GUSTAV R. BURANDT.